(12) United States Patent
Dershem

(10) Patent No.: US 10,371,233 B2
(45) Date of Patent: Aug. 6, 2019

(54) BUNGEE CORD/STRAP AND METHOD OF USE

(71) Applicant: Jeffrey L. Dershem, Zionsville, PA (US)

(72) Inventor: Jeffrey L. Dershem, Zionsville, PA (US)

(73) Assignees: Jeffrey L. Dershem, Zionsville, PA (US); Deborah L. Dershem, Zionsville, PA (US)

( * ) Notice: Subject to any disclaimer, the term of this patent is extended or adjusted under 35 U.S.C. 154(b) by 0 days.

(21) Appl. No.: 14/483,292

(22) Filed: Sep. 11, 2014

(65) Prior Publication Data

US 2015/0074953 A1 Mar. 19, 2015

Related U.S. Application Data

(60) Provisional application No. 61/877,387, filed on Sep. 13, 2013.

(51) Int. Cl.
| | |
|---|---|
| *F16G 11/14* | (2006.01) |
| *F16B 45/00* | (2006.01) |
| *A63B 21/055* | (2006.01) |
| *B60P 7/08* | (2006.01) |
| *F21V 33/00* | (2006.01) |
| *F21Y 103/10* | (2016.01) |
| *F21Y 115/10* | (2016.01) |

(52) U.S. Cl.
CPC .......... *F16G 11/14* (2013.01); *A63B 21/0557* (2013.01); *B60P 7/0823* (2013.01); *F16B 45/00* (2013.01); *A63B 2207/02* (2013.01); *F21V 33/008* (2013.01); *F21Y 2103/10* (2016.08); *F21Y 2115/10* (2016.08); *Y10T 24/316* (2015.01); *Y10T 29/49826* (2015.01)

(58) Field of Classification Search
CPC .... B60P 7/0807; B60P 7/0823; Y10T 24/316; Y10T 24/4755; Y10T 24/314; Y10T 24/3929; Y10T 292/34; F16G 11/14; A63B 21/0557; E05C 19/186; Y10S 292/65
USPC .......................................................... 362/104
See application file for complete search history.

(56) References Cited

U.S. PATENT DOCUMENTS

| | | | |
|---|---|---|---|
| 3,012,806 A | * | 12/1961 | Ellis ...................... E05C 19/186 292/288 |
| 4,552,552 A | | 11/1985 | Polaschegg et al. |
| 4,553,765 A | | 11/1985 | Negoro |
| 4,559,677 A | | 12/1985 | Tracy |
| 4,660,835 A | | 4/1987 | Locurto |
| 5,186,572 A | | 2/1993 | Frano et al. |

(Continued)

FOREIGN PATENT DOCUMENTS

| | | |
|---|---|---|
| CN | 201282208 | 7/2009 |
| GB | 2439740 | 1/2011 |

OTHER PUBLICATIONS

Autoline Network. 'Win a Set of Perfect Bungees!' YouTube [online] Apr. 24, 2011 [retrieved Nov. 28, 2011] <URL:https://www.youtube.com/watch?v=govml9CUUHQ>.

*Primary Examiner* — Jack W Lavinder
(74) *Attorney, Agent, or Firm* — Clark & Brody

(57) ABSTRACT

A bungee cord/strap includes an elastic tubular body having an inner surface extending along a length thereof and opposing ends. A pair of inserts are provided, each insert including a connector at one end thereof and a means for attaching to the inner surface of the elastic tubular body at an end thereof.

14 Claims, 4 Drawing Sheets

(56) References Cited

U.S. PATENT DOCUMENTS

| | | | |
|---|---|---|---|
| 5,286,068 A | 2/1994 | Wiebe | |
| 5,472,768 A | 12/1995 | Anson | |
| 5,546,639 A | 8/1996 | Lacore et al. | |
| 5,611,540 A | 3/1997 | Williams et al. | |
| 5,638,584 A | 6/1997 | De Anfrasio | |
| 5,639,000 A * | 6/1997 | McDaniel | A44C 5/0053 224/164 |
| 5,931,145 A | 8/1999 | Oviedo-Reyes | |
| 6,014,794 A | 1/2000 | McCoy | |
| 6,093,136 A | 7/2000 | Whipple | |
| 6,308,383 B1 | 10/2001 | Schrader | |
| 6,345,472 B1 | 2/2002 | Taylor | |
| 6,455,117 B1 | 9/2002 | Margucci | |
| 6,478,419 B1 | 11/2002 | McDaniel | |
| 6,604,841 B2 | 8/2003 | Liu | |
| 6,743,157 B2 | 6/2004 | Hackaday | |
| 6,779,269 B2 | 8/2004 | Green et al. | |
| 6,868,586 B1 | 3/2005 | Hall | |
| 6,945,669 B1 | 9/2005 | Jester | |
| 7,011,427 B1 * | 3/2006 | Baez | G08B 5/004 362/184 |
| 7,104,668 B1 * | 9/2006 | Lee | A44C 15/0015 362/103 |
| 7,331,311 B2 | 2/2008 | Hurwitz | |
| 7,536,754 B2 | 5/2009 | Campbell et al. | |
| 7,540,070 B1 | 6/2009 | Selby | |
| 7,546,852 B1 | 6/2009 | Fails et al. | |
| 7,571,521 B1 | 8/2009 | Backman | |
| 7,581,762 B1 | 9/2009 | Werner | |
| 7,594,681 B2 | 9/2009 | DeCarlo | |
| 7,712,195 B1 | 5/2010 | Selby | |
| D618,536 S | 6/2010 | Eason | |
| 7,805,816 B1 | 10/2010 | Thorne et al. | |
| D659,515 S | 5/2012 | Schoen et al. | |
| 8,206,799 B2 | 6/2012 | Van Lumig et al. | |
| 8,272,108 B2 | 9/2012 | Langtry et al. | |
| 8,365,502 B2 | 2/2013 | Allen et al. | |
| 8,439,775 B2 | 5/2013 | Stephenson | |
| 2005/0113221 A1 | 5/2005 | Dovner et al. | |
| 2012/0120638 A1 * | 5/2012 | Gonzalez | A45C 13/30 362/154 |

* cited by examiner

BUNGEE CORD/STRAP AND METHOD OF USE

This application claims priority under 35 USC 119(e) based on application No. 61/877,387, filed on Sep. 13, 2013.

FIELD OF THE INVENTION

The present invention relates to an improved bungee cord/strap and, in particular, to a bungee cord/strap that has an elastic tubular body and a pair of inserts with hooks, loops, or the like designed to engage the inner ends of the tubular body.

BACKGROUND ART

Bungee cords/straps are well known in the art. They generally comprise an elastic solid body with end connectors attached to the ends of the solid body. In some constructions, the elastic body is covered with a fabric or other coating material. In other constructions, the solid body itself is used with the end connectors. The end connectors generally have a hook and are clamped to the ends of the solid body or the covered solid body. The bungee cords/straps come in various lengths and the elastic body size and type can vary depending on the intended use. Heavier duty cords use elastic bodies that are higher in strength so as to handle higher tensile forces when used to secure an article, cargo or the like. These cords/straps are generally made of thermal cast polyurethane compounds and are used primarily in commercial applications. However, due to the expensive nature of this material, it is not suitable for use in the residential or consumer markets; the cords/straps would be just too expensive to sell.

The present invention provides an improved bungee cord/strap construction that permits the use of thermal plastic urethane materials that used utilizes injection molding and extrusion manufacturing techniques in cord/strap construction but in a manner that allows the cords/straps to be more economical to manufacturer and therefore more easily sold for use in the residential and consumer markets. Due to the hollow tubular design, the bungee straps can utilize less material and stronger materials to maintain better performance at less cost over the previous aforementioned designs of cords/straps. The tubular design with various interchangeable inserted ends also adds to the present invention's advantages.

SUMMARY OF THE INVENTION

One object of the invention is to provide an improved bungee cord/strap construction methodology utilizing less labor intense manufacturing techniques and stronger more resilient raw materials.

A second object of the invention is to provide a bungee cord/strap that can include a safety member within the tubular body to prevent injury should the end connectors of the bungee tube separate from the tube body.

Another object of the invention is to provide a bungee cord/strap that can incorporate a light source within the tubular body as a warning, indicator and or providing illumination while in use securing an article, cargo or the like.

Yet another object is a method of securing an article(s) or other item(s) using the inventive bungee tube utilizing variable and multiple inserted tube end attachments.

Other objects and advantages will be apparent from a description of the details of the invention.

The bungee cord/strap in one embodiment comprising a stretchable elastic tubular body that can be made in various lengths. The cord/s strap has an inner surface extending along a length thereof and opposing insertable open ends. A pair of internal tube inserts is provided with each attachment including a connector at one end thereof and a means for attaching the insert to the inner surface of the elastic tubular body at an end thereof.

The attachment insert can take on any shape typically used in bungee cord applications, including a hook or a loop, but can have other shapes that would facilitate attachment to a given item.

The elastic tubular body can made from any elastic material that would function in a bungee cord/strap application, including injection molding grade and extrusion grade thermal plastic urethane and or other thermal plastic elastomers.

The attaching means to connect the insert to the inside of the tubular body can be a threaded end on the insert configured to threadably attach to the inner surface of the elastic tubular body. Other possible attachment means could include an adhesive to attach the inner surface of the elastic tubular body to an outer surface of the insert body. The threaded end of the insert could be in combination with threads or other protrusions (barbs) on the inner surface of the tubular body. The insert could include protrusions designed to catch on the inner surface of the tubular body such that it cannot be pulled out of it. Combinations of the various attachment means could be used as well, including the terminal attachment being a molded insert and attachment in a single monolithic design; a molded insert and attachment as one body.

Another embodiment of the invention includes the combination of a safety tether and the bungee tube. The tether is disposed within the elastic tubular body and connected to each of the inserts. The safety tether has a length longer (coiled inside the tubular body) than the elastic tubular body, wherein the safety tether remains connected to the inserts should one or both of the inserts separate from the elastic tubular body.

Yet another embodiment is the combination of the bungee tube and a light, wherein the light is disposed within the tubular elastic body.

The invention also entails method of securing one or more items using the inventive bungee tube or in the case of the bungee tube with a light source, it could be used just for warning or other illumination purposes.

DETAILED DESCRIPTION OF THE INVENTION

Figure 1:
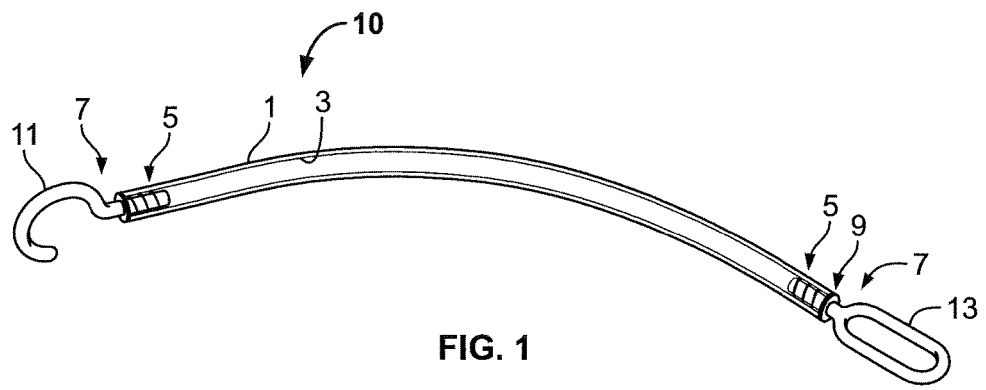
FIG. 1 shows a perspective view of a first embodiment of the invention.
Figure 2:
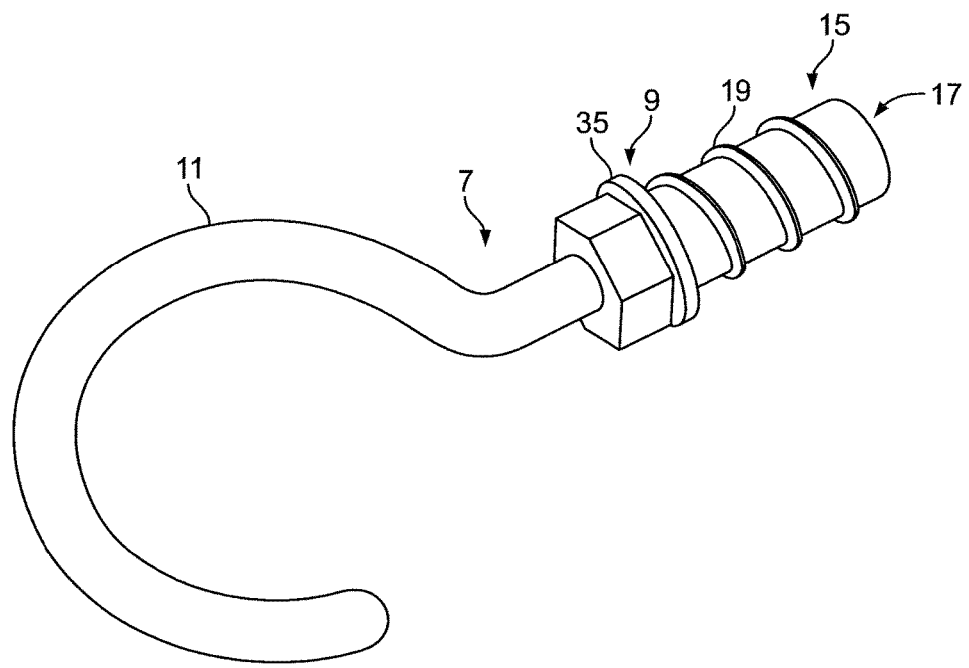
FIG. 2 shows one of the inserts used in FIG. 1.
Figure 3:
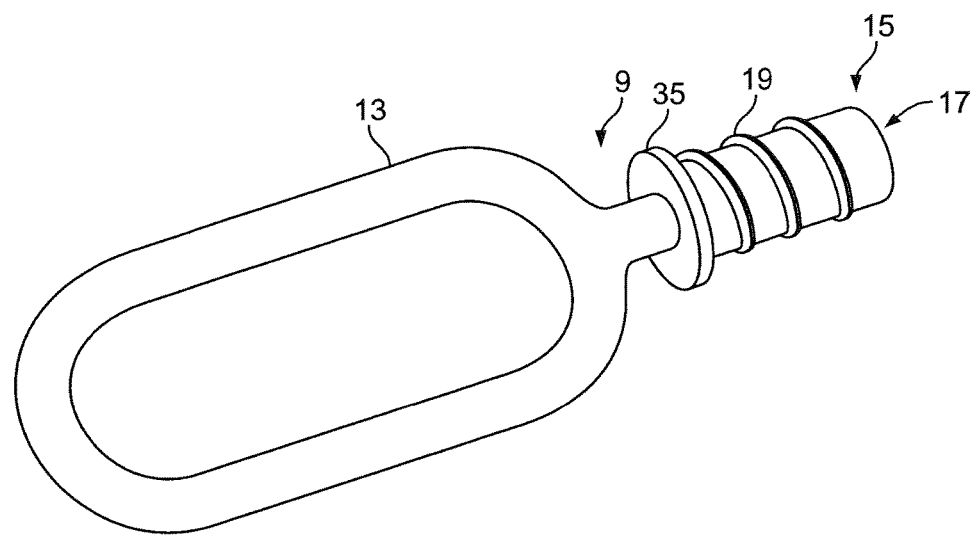
FIG. 3 shows another one of the inserts used in FIG. 1.

FIGS. 1-3 show a first embodiment of a bungee cord of the present invention. The bungee cord (hereinafter "cord") is designated by the reference numeral 10 and includes an elastic body 1 that is tubular in shape. The elastic body 1 includes an inner surface 3 that extends along the length of the elastic body. The elastic body also includes opposing ends 5, which cooperate with inserts 7 to form the completed cord.

Each insert 7 includes an insert body 9 that includes two functions. The body 9 includes a connector at one end thereof. The connector is shown as a hook 11 in FIGS. 1 and 2, but it can take on any shape that permits attachment to a desired item or think. One alternative is a loop 13, which is also depicted in FIGS. 1 and 3. While the loop is shown in an elongated shape, the loop could have a circle shape, square, rectangular, or the like. In a preferred embodiment, the connector is a hook 11 as shown in FIGS. 1 and 2 or a loop 13 as shown in FIGS. 1 and 3. While FIG. 1 shows the combination of a hook 11 and loop 13 for a given cord 10, the cord 10 could include hooks 11 at each end 5 or loops 13 on each end 5.

An end 17 of the insert 7 has means for attaching the insert 7 to the tubular body 1. This means for attaching in this embodiment and shown in FIGS. 1-3 is a threaded surface 19 on the insert end 17. This is one example of a means of attaching the insert 7 to the tubular body 1 but other means are explained below.

Figure 4:
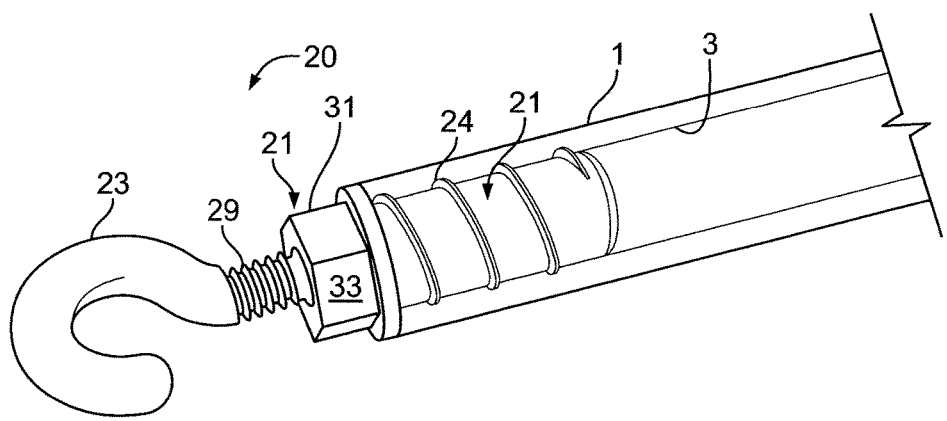
FIG. 4 shows a second embodiment of the invention.
Figure 5:
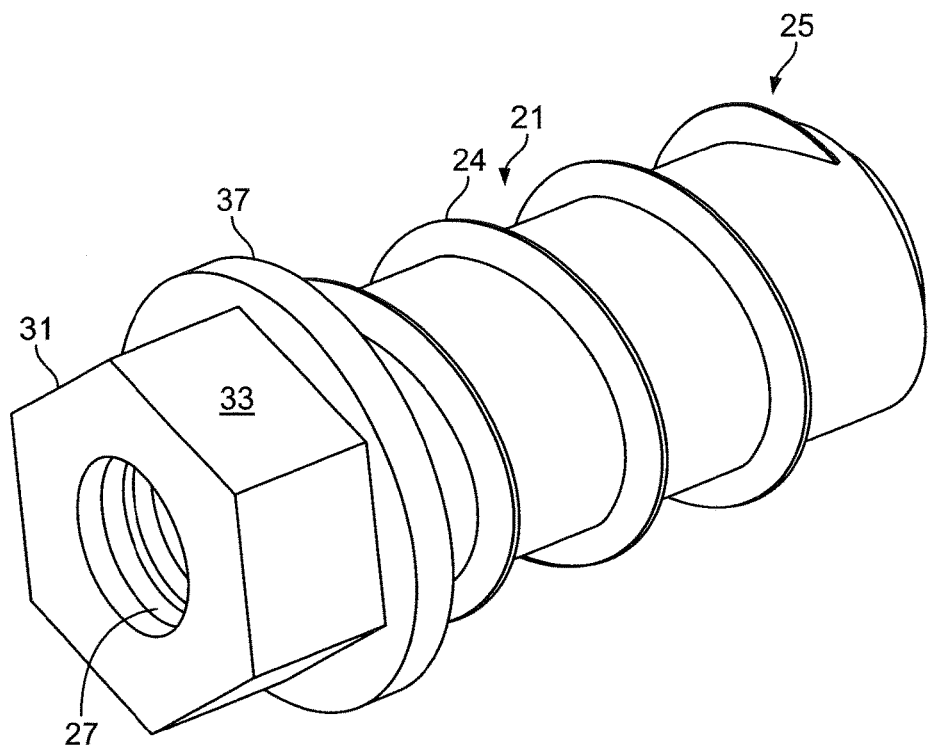
FIG. 5 shows a second part of an insert according to a second embodiment of the invention of FIG. 4.

A second embodiment of the insert is shown in FIGS. 4 and 5. In this embodiment, the insert 20 can be a two piece construction, which includes an insert body 21 and a separate connector 23, shown as a hook. The insert body 21 can employ the same type of attaching means on the body end 25 as shown in FIGS. 2 and 3, i.e., threads 24. The insert body 21 has a threaded bore 27 (see FIG. 5), which is sized to threadably receive the threaded portion 29 of the connector 23. While a threaded connection is shown here, other means for attaching the connector 23 to the insert body 21 could be used, e.g., a quick connector, a pin connection, etc. The advantage of this embodiment is that one insert body 21 can be employed with different types of connectors 23, e.g., a hook could be used, an eye or loop could be used, etc. In fact, a kit of different connectors 23 could be supplied with the bungee cord with its two insert bodies 21 so that the user would have a selection of different connector configurations on hand for the desired use. In this embodiment, the insert body 21 includes a nut-shaped portion 31, which facilitates the attachment of the threaded portion 29 to the bore 27 in the body 1, by providing gripping surfaces 33.

In each of the embodiments of FIGS. 1-5, and with reference to FIG. 2, the insert body 9 can also include a flange 35. The flange 35 is sized so that an undersurface 37, see FIG. 5, contacts an end face of the end 5 of the tubular body 1. In this way, when the insert body is screwed tightly into the end 5 of the tubular body, the flange 35 comes to rest against the end face of the end 5 and prevents further tightening that may harm the connection between the insert 7 and the tubular body 1.

Another embodiment of the invention uses a safety tether with the bungee cord. This safety tether is such that it is attached to each of the inserts and is positioned within the core of the tubular elastic body. Since the tubular elastic body of the cord will expand in length when used, the safety tether length must have a length that will match the stretchable length of the cord so as not to interfere with the cord expansion. Preferably, the length of the safety tether will be longer than the expanded length of the bungee cord so that there is no chance for the safety tether to interfere with the cord operation.

Figure 6:
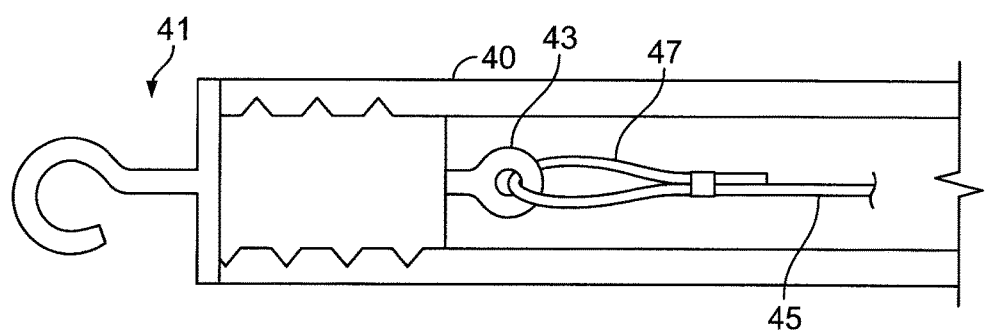
FIG. 6 shows another embodiment of the invention using a safety tether linked to the insert and inside the tubular body.

FIG. 6 shows the safety tether embodiment by illustrating a portion of the cord. In this embodiment, the tubular body is designated by the reference numeral 40 and an insert 41 is attached to the tubular body 40. The insert 41 has a loop 43, which is used as a means for attaching a tether 45 to the insert 41. The tether 45 includes its own loop 47, which is attached to the loop 43 of the insert 41. Of course, other attaching means can be used to secure the ends of the tether 45 to each of the inserts 41, e.g., a hook, a passageway in the insert 41, and the like. The tether 45 can be made of any material that would keep the opposing inserts 41 together if one or both of the inserts 41 would separate from the tubular elastic body 40. Exemplary materials would include nylon or another polymer, metallic materials like cable, and the like. The tether should also be sized in terms of diameter and length so that it can readily fit within the lumen in the tubular elastic body, even with the tether doubled or tripled over in places so that it has sufficient length to accommodate expansion of the bungee cord.

Figure 7:
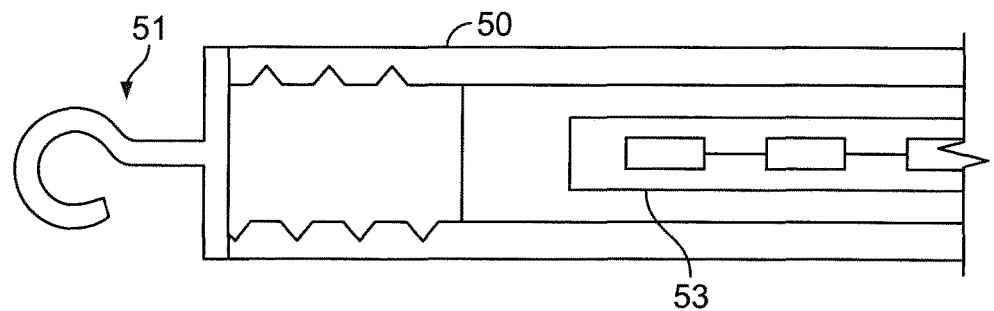
FIG. 7 shows another embodiment of the invention wherein a light source is disposed within the tubular body.

FIG. 7 shows another embodiment of the invention. The tubular body is designated by reference numeral 50 and includes inserts 51 (only one shown). A light source designated by reference numeral 53 is shown inside the tubular elastic body 50. The light source 53 can be any type of light source that would operate on battery power, e.g., a red LED rope light. The light could have a switch that could be activated by pressing the tubular body, which would be flexible in order to permit the switch to be turned on and off. Other activation mechanisms as would be known in the art could be used. The light could be photocell activated as well.

With this embodiment, the cord can be used to not only secure something but also provide a warning light or illumination for others or the user. This would be particularly useful when hauling an item that extends off the back of a vehicle and a warning light is needed to alert other motorists of the item's extension off the back of the vehicle. Here, the bungee cord could just be connected to the item for warning purposes and not necessarily be used to secure an item. Of course, it could both secure an item and provide the desired lighting as well.

While the light source 53 is shown as free floating in the tubular body 50, it could be attached to one or both of the inserts 51. If attached to both inserts, it would have to have expansion capability to match the expansion of the tubular body 50 when being used to secure an article or the like. If attached to both inserts, it could double as a light source and safety tether. The attachment to the insert could be any known means, including the loop and line type of attachment shown in FIG. 6.

The insert could be made of any material that would have sufficient strength to perform adequately when the bungee cord is being used. Materials could include polymers and metals.

The material for the elastic tubular body can also be any material that would have the desired expansion capability and strength to function in a bungee cord application. A preferred material is thermal cast polyurethane but other stretchable materials could be used providing they can be made in the shape of the tubular body and have the required characteristics for bungee cord application. While the size of the elastic tubular body will vary in terms of its length and wall thickness, a typical range of lengths would be from 1-4 feet. Typical wall thickness would be from 0.0625 to 0.250 inches and typical diameters would be less than 1 inch.

The inside of the tubular body could be left hollow or it could include a co-extruded or injected material if desired. The material could be a decorative material that would cooperate with a clear or opaque tubular body to enhance the look of the bungee tube; perhaps providing reflective or "glow-in-the dark" properties. The materials could be packed tightly or loosely in the contracted position of the cord, with the loose packing allowing for movement of the material if a sound effect would be desired.

The glow in the dark or photoluminescence feature can also be achieved by including the required additives into or onto the material used for manufacturing the cord, the inserts, or both. This material could be incorporated into a polymer if the tube or inserts were made from a polymeric material. Reflective materials could also be employed in connection with the tube or inserts, either as part of the material itself or as a coating application. In this way, rather than having a glow in the dark material inside the tube, the tube or insert itself has the photoluminescence.

The tubular body of the invention can be made in any known fashion, with a preferred method being extrusion of the thermal plastic urethane, cast polyurethane or other elastomeric compounds. When making the tubes using an extrusion process, it maybe preferred to employ a vacuum to prevent the tube from collapsing on itself when being extruded. The inserts could be molded if made from a polymeric plastic type material and machined or molded if made from a metallic material. The inserts and attachments could also be molded or machined as a single unit; insert and attachment as one body. FIGS. 2 and 3 show a one piece or monolithic design for the insert 7, so that the connector 11 and the means for attaching the insert to the tubular body are integral or one piece. This can be achieved by molding the entire insert as a one piece article. This one piece or monolithic design is in contrast to the two piece design shown in FIGS. 4 and 5, wherein the connector is separate and removable/attachable with respect to the insert body 21.

Figure 8:
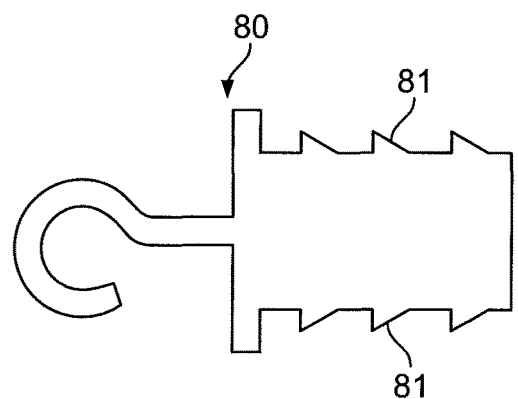
FIG. 8 shows an insert with barbs to attach to the inner surface of the tubular body.
Figure 9:
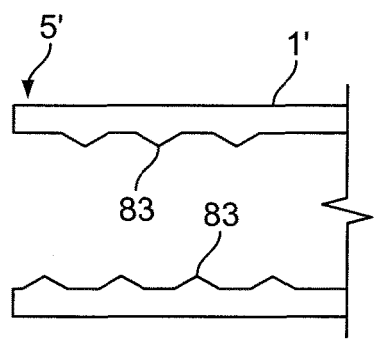
FIG. 9 shows threads on the inner surface of the tubular body for engagement with threads on an insert.

While a threaded connection is shown as the means for attaching the inserts to the inner surface of the tubular body, this is not the only option to provide the necessary attachment. The threads could be combined with an adhesive. Alternatively, the inner surface of the tubular body could be provided with some frictional surface, e.g., a roughened surface, some arrangement of protrusions, or complementary threads to engage the threads on the insert. The insert could have a smooth body (no threads) and an adhesive could be used for attachment purposes. Further yet, another alternative, and with reference to FIG. 8, an insert body 80 is shown with barbs 81, which project toward the hook end of the insert. Once inserted into the lumen of the tubular body, the barbs 81 would prevent removal of the insert body 80 by engaging the inner surface of the tubular body. FIG. 9 shows the end 5' of a tubular body 1' that has threads 83 to engage with threads of an insert body (not shown).

The inventive bungee tubes can be used in any application where an item would need to be secured as is common with present day bungee cords/straps. Since the inventive bungee tube can also provide light, it could be attached just for the purpose of providing a warning or some form of illumination. Since bungee cords/straps are known to be made for light and heavy duty applications, the inventive bungee tube could be made multi-functional in the same fashion. For example, two metal inserts could be used for heavier duty application and the attached terminal threaded hook could further use mating threads on the insert and inside of the tubular body to enhance the attachment. Lighter duty applications could use polymer (plastic type) inserts with less robust means of attaching of the inserts to the tubular body given the lighter duty applications.

As such, an invention has been disclosed in terms of preferred embodiments thereof which fulfills each and every one of the objects of the present invention as set forth above and provides a new and improved bungee cord/strapo and method of use.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A bungee cord or strap comprising:
   an elastic tubular body having an inner surface extending along a length thereof and opposing ends;
   a pair of inserts, each insert including a connector at one end thereof and an insert body at another end, the insert body including a body portion having an end face, the body portion sized to fit in an end of the elastic tubular body and attach to an inner surface thereof, the insert body having an integral connection with the connector or having with a recess at the one end thereof to removably receive the connector, at least a portion of the body portion being solid in cross section, and
   attaching means to attach the body portion to the inner surface of the elastic tubular body, wherein the attaching means includes one of threads on the insert body configured to threadably attach to the inner surface of the elastic tubular body, an adhesive to attach the inner surface of the elastic tubular body to an outer surface of the insert body, the threads of the insert body in combination with threads or other protrusions on the inner surface of the tubular body, protrusions on the outer surface of the insert body configured to engage the inner surface of the tubular body to prevent insert removal, or a combination thereof, wherein the inner surface of the elastic tubular body includes threads to enhance attachment of the insert body to the elastic tubular body,
   the elastic tubular body being able to stretch and contract so as to allow the elastic tubular body and the connector on each insert to allow the bungee cord to be able to secure one or more items, and further wherein a hollow and empty space exists within the elastic tubular body and between each end face of each insert body,
   wherein at least one connector further comprises a hook, the hook including a hook body extending from an end of the insert and forming a curved portion that terminates in a hook free end, the hook free end spaced from the end of the insert to create an opening to allow the curved portion to hook to a surface to secure the one or more items.

2. The bungee cord or strap of claim 1, wherein the elastic tubular body is made from injection molded, extruded thermal plastic urethane, and or cast polyurethane or other elastomeric compound.

3. In a method of securing one or more items using a bungee cord or strap, the improvement comprising using the bungee cord/strap of claim 1 for said securing step.

4. The bungee cord or strap of claim 1, wherein each insert has a one piece integral construction comprising the connector and means for attaching the insert body to the inner surface of the elastic tubular body.

5. The bungee cord or strap of claim 1, wherein each insert has a two piece construction, comprising the connector, the connector being a hook or a loop, and an insert body with the connector being removably attachable to the insert body.

6. The bungee cord or strap of claim 1, wherein the elastic tubular body is made from injection molded, extruded thermal plastic urethane, and or cast polyurethane or other elastomeric compound.

7. The bungee cord or strap of claim 1, wherein the connector comprises at least one loop.

8. The hunger cord or strap of claim 1, wherein each connector further comprises the hook.

9. A bungee cord or strap comprising:
an elastic tubular body having an inner surface extending along a length thereof and opposing ends;
a pair of inserts, each insert including a connector at one end thereof and a means for attaching the insert to the inner surface of the elastic tubular body at an end thereof, each insert having a longitudinal axis and comprising an insert body which is solid through a direction perpendicular to the longitudinal axis, the means for attaching being part of the insert body, and further comprising a safety tether disposed within the elastic tubular body and connected to each of the inserts, the safety tether having a length longer than the elastic tubular body, wherein the safety tether remains connected to the inserts should one or both of the inserts separate from the elastic tubular body.

10. The bungee cord or strap of claim 9, wherein the connector comprises at least one hook.

11. The bungee cord or strap of claim 9, wherein the elastic tubular body is made from injection molded, extruded thermal plastic urethane, and or cast polyurethane or other elastomeric compound.

12. A bungee cord or strap comprising:
an elastic tubular body having an inner surface extending along a length thereof and opposing ends;
a pair of inserts, each insert including a connector at one end thereof and an insert body at another end, the insert body including a body portion sized to fit in an end of the elastic tubular body and attach to an inner surface thereof, the insert body having an integral connection with the connector or having with a recess at the one end thereof to removably receive the connector, at least a portion of the body portion being solid in cross section, and
a light disposed inside of the elastic tubular body, the light unattached to an inside of the elastic tubular body and unattached to the inserts,
the elastic tubular body being able to stretch and contract so as to allow the elastic tubular body and the connector on each insert to allow the bungee cord to be able to secure one or more items.

13. A method of providing a light for warning or illumination comprising attaching the bungee cord or strap of claim 12 in a location where a warning or illumination is needed.

14. The bungee cord or strap of claim 12, wherein a tether cord is attached between the two inserts and is expandable to match stretch of the elastic tubular body, the tether cord including a plurality of the lights thereon.

* * * * *